United States Patent
Yoshida et al.

(10) Patent No.: US 11,137,026 B2
(45) Date of Patent: Oct. 5, 2021

(54) CONTROL DEVICE FOR MAGNETIC BEARING AND CONTROL METHOD

(71) Applicant: Hitachi, Ltd., Tokyo (JP)

(72) Inventors: Toyomi Yoshida, Tokyo (JP); Kazuyuki Yamaguchi, Tokyo (JP); Yohei Magara, Tokyo (JP); Kiyoshi Yabata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 118 days.

(21) Appl. No.: 16/610,316

(22) PCT Filed: Feb. 20, 2018

(86) PCT No.: PCT/JP2018/006022
§ 371 (c)(1),
(2) Date: Nov. 1, 2019

(87) PCT Pub. No.: WO2019/008815
PCT Pub. Date: Jan. 10, 2019

(65) Prior Publication Data
US 2020/0080591 A1    Mar. 12, 2020

(30) Foreign Application Priority Data
Jul. 4, 2017   (JP) .............................. JP2017-130979

(51) Int. Cl.
*F16C 32/04*   (2006.01)
*H02K 7/09*    (2006.01)

(52) U.S. Cl.
CPC ...... *F16C 32/0446* (2013.01); *F16C 32/0451* (2013.01); *H02K 7/09* (2013.01)

(58) Field of Classification Search
CPC .............. F16C 32/0446; F16C 32/0448; F16C 32/0451; F16C 32/0453; H02K 7/09
(Continued)

(56) References Cited

U.S. PATENT DOCUMENTS 4,841,212 A * 6/1989 Matsushita ......... F16C 32/0453
                                                  310/90.5
4,999,534 A * 3/1991 Andrianos .......... F16C 32/0444
                                                  310/51
(Continued)

FOREIGN PATENT DOCUMENTS

EP   3 023 655 A1   5/2016
JP   62-177314 A    8/1987
(Continued)

OTHER PUBLICATIONS

International Search Report (PCT/ISA/210) issued in PCT Application No. PCT/JP2018/006022 dated Apr. 24, 2018 with English translation (five (5) pages).
(Continued)

*Primary Examiner* — Ahmed Elnakib
(74) *Attorney, Agent, or Firm* — Crowell & Moring LLP

(57) ABSTRACT

The present invention is to reduce the load on a control device by reliably classifying vibration modes of a rotor, thereby facilitating stabilization design of a magnetic bearing. The present invention includes: magnetic bearings including electromagnets provided at one end and the other end of a rotor to contactlessly support the one end and the other end of the rotor by the magnetic attraction forces of the electromagnets; and displacement sensors that measure an inclination at the one end of the rotor and an inclination at the other end of the rotor, in which the magnetic attraction forces of the electromagnets are controlled based on the inclinations measured by the displacement sensors.

11 Claims, 7 Drawing Sheets

(58) Field of Classification Search
USPC .......................... 310/90.5; 318/623, 647, 653
See application file for complete search history.

(56) References Cited

U.S. PATENT DOCUMENTS

| | | | |
|---|---|---|---|
| 5,576,587 A | | 11/1996 | Takahashi et al. |
| 5,754,425 A | * | 5/1998 | Murakami .......... F16C 32/0455 |
| | | | 310/40 R |
| 6,734,650 B2 | * | 5/2004 | Abel ................... F16C 32/0451 |
| | | | 310/90.5 |
| 2016/0230810 A1 | | 8/2016 | Huang et al. |

FOREIGN PATENT DOCUMENTS

| | | | |
|---|---|---|---|
| JP | 63-308215 A | | 12/1988 |
| JP | 4-300417 A | | 10/1992 |
| JP | H04300417 | * | 10/1992 |
| JP | JR 6-17830 A | | 1/1994 |
| JP | 7-259853 A | | 10/1995 |
| JP | 2001-304257 | * | 10/2001 |
| JP | 2001-304257 A | | 10/2001 |
| JP | 2016-535580 A | | 11/2016 |

OTHER PUBLICATIONS

Japanese-language Written Opinion (PCT/ISA/237) issued in PCT Application No. PCT/JP2018/006022 dated Apr. 24, 2018 (six (6) pages).

* cited by examiner

[FIG. 1]
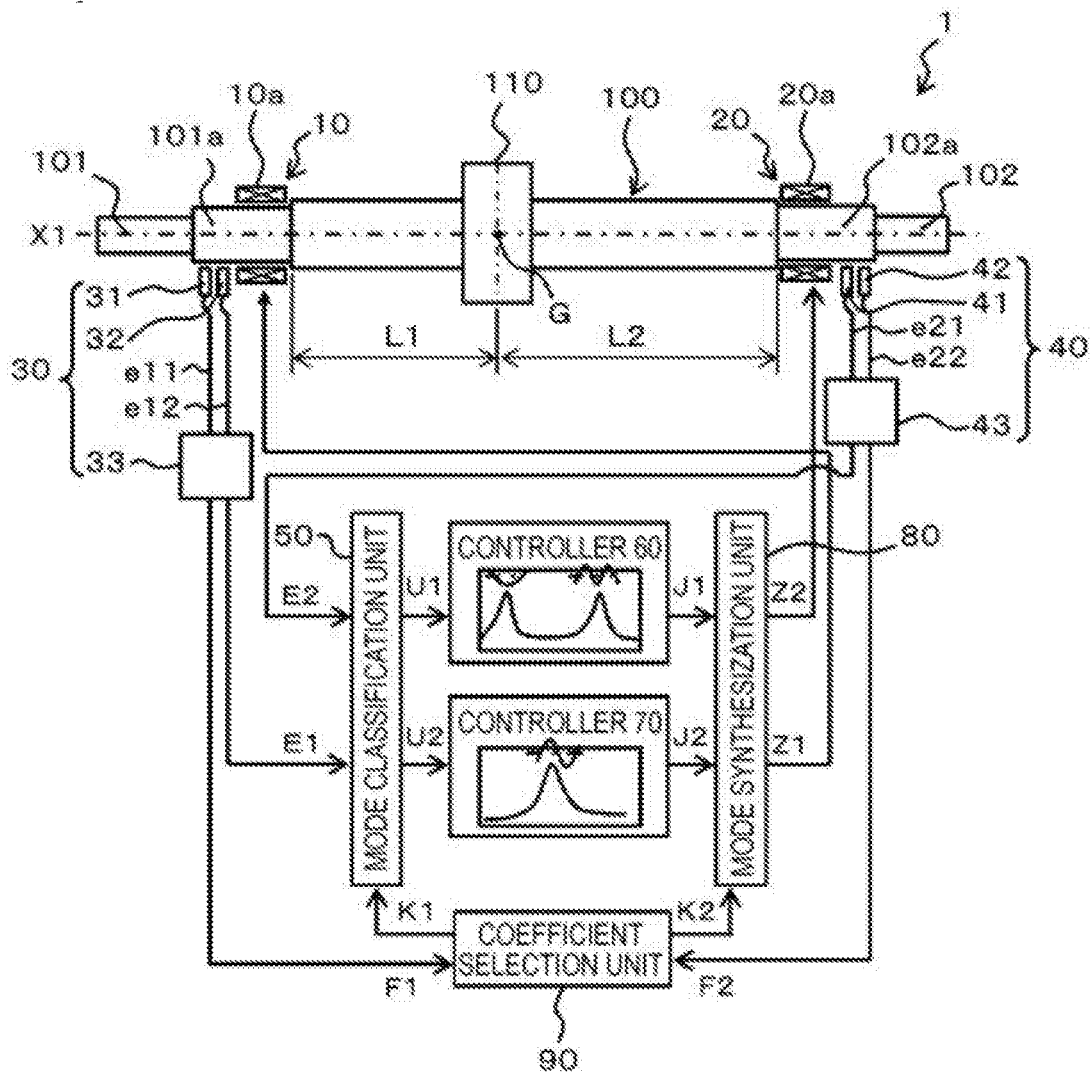

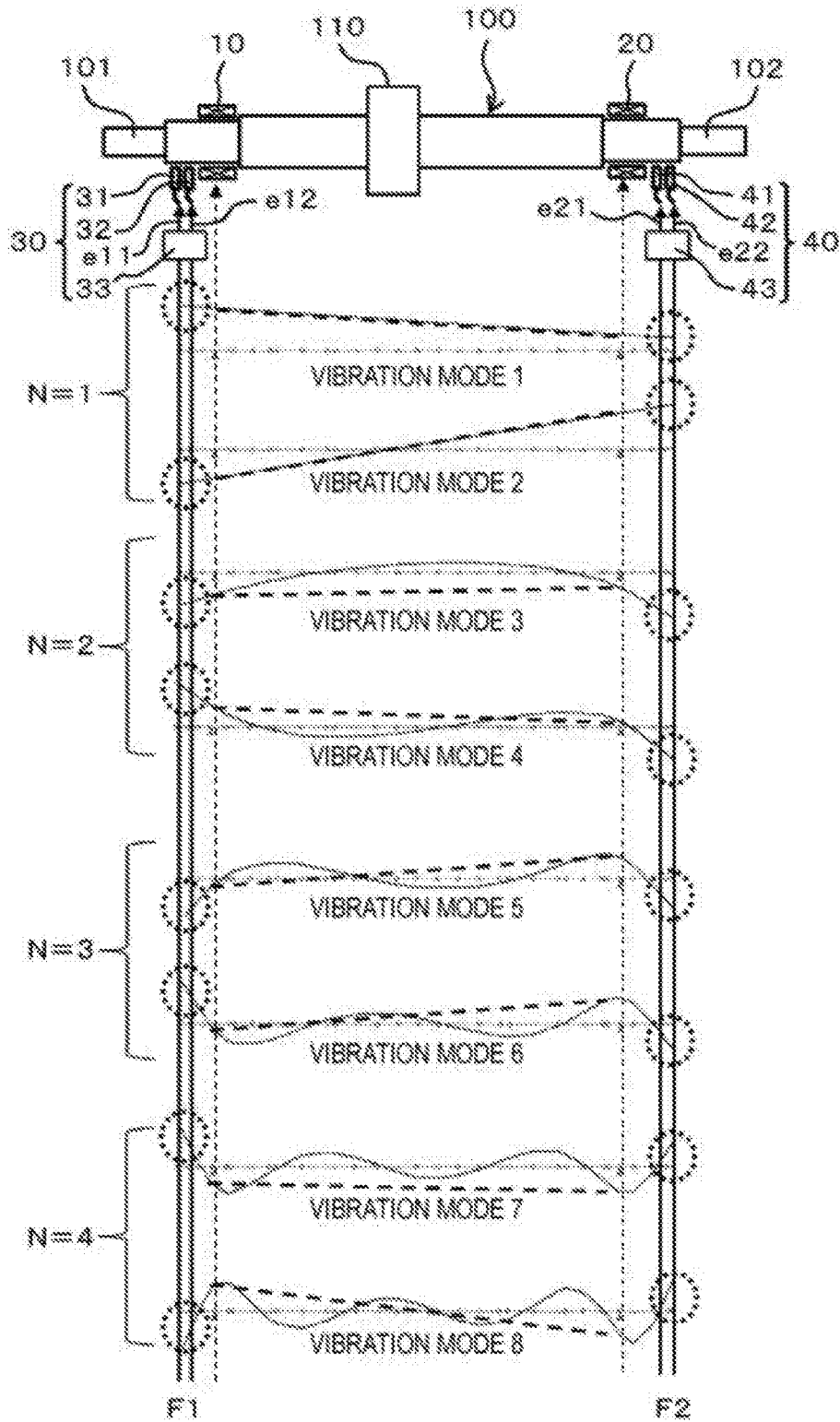
[FIG. 2]

[FIG. 3]
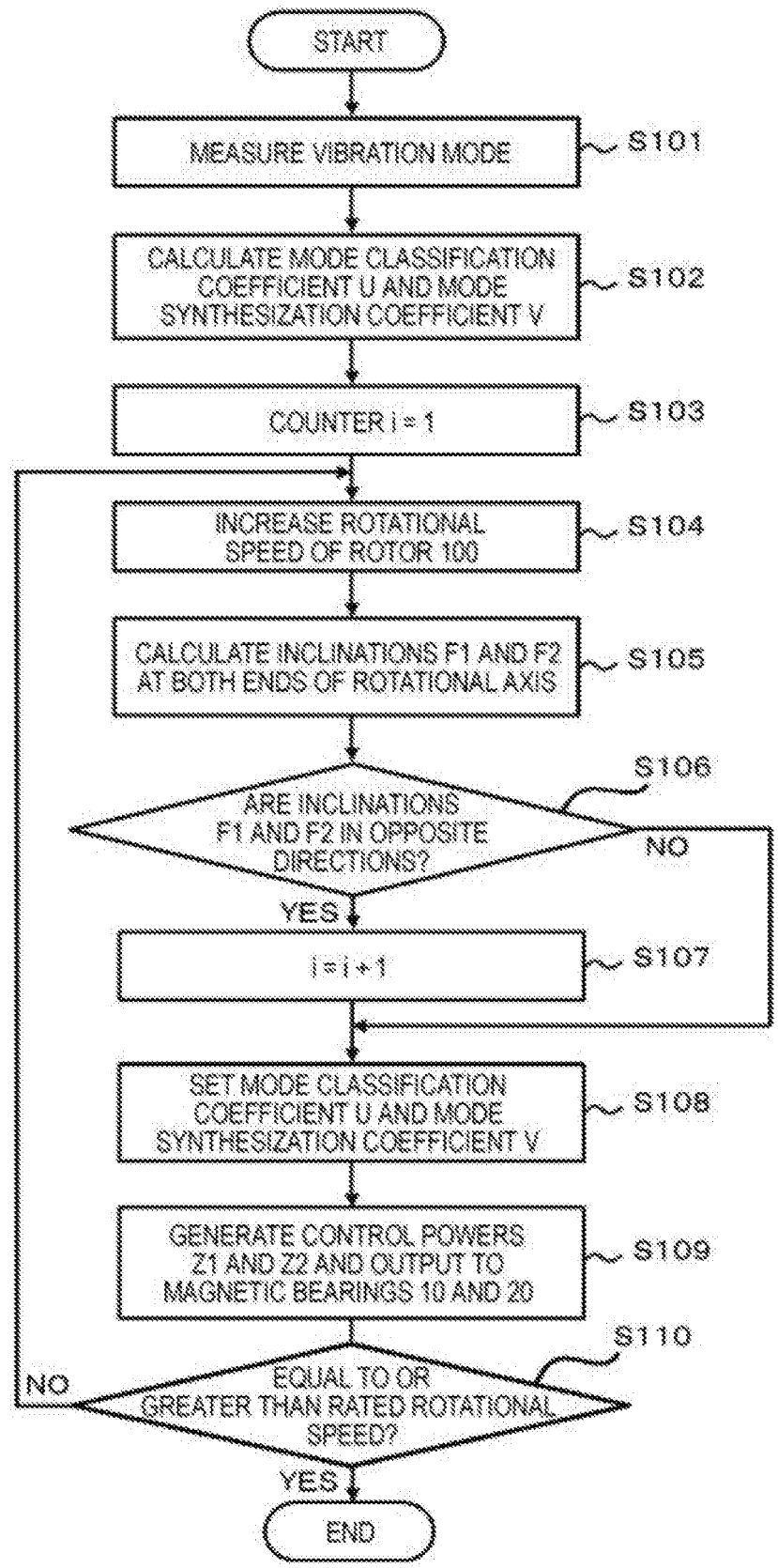

[FIG. 4]
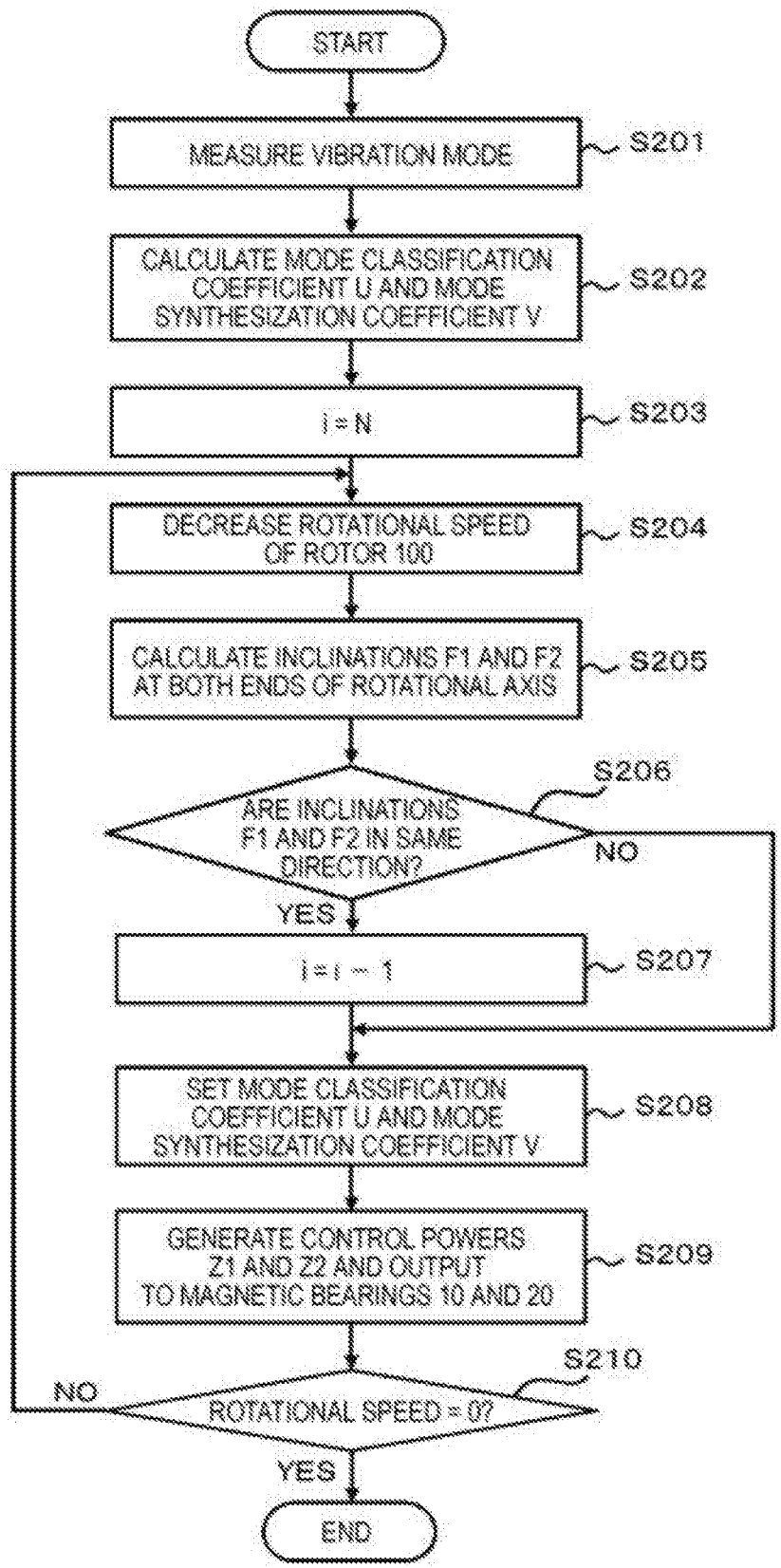

[FIG. 5]
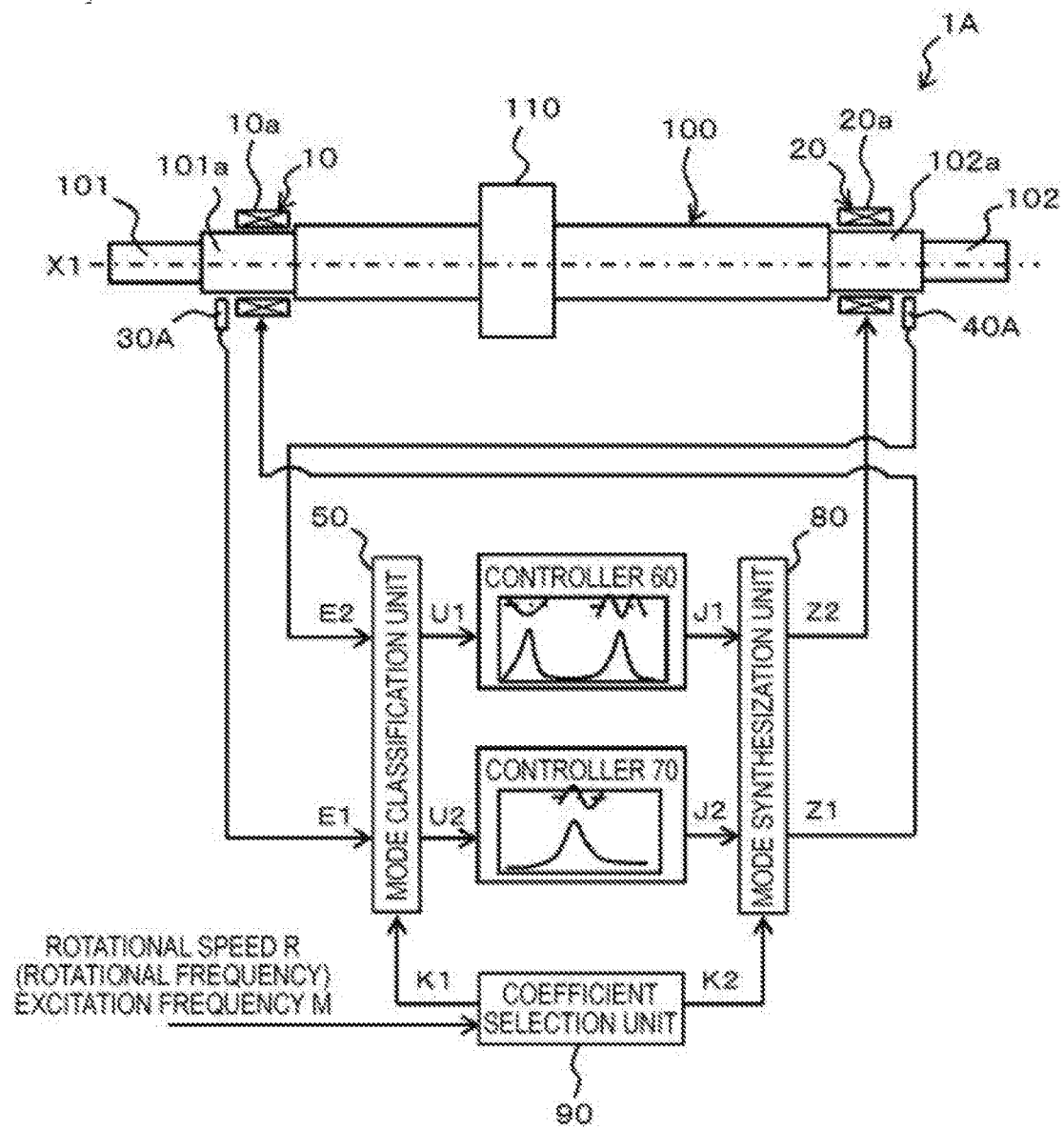

[FIG. 6]
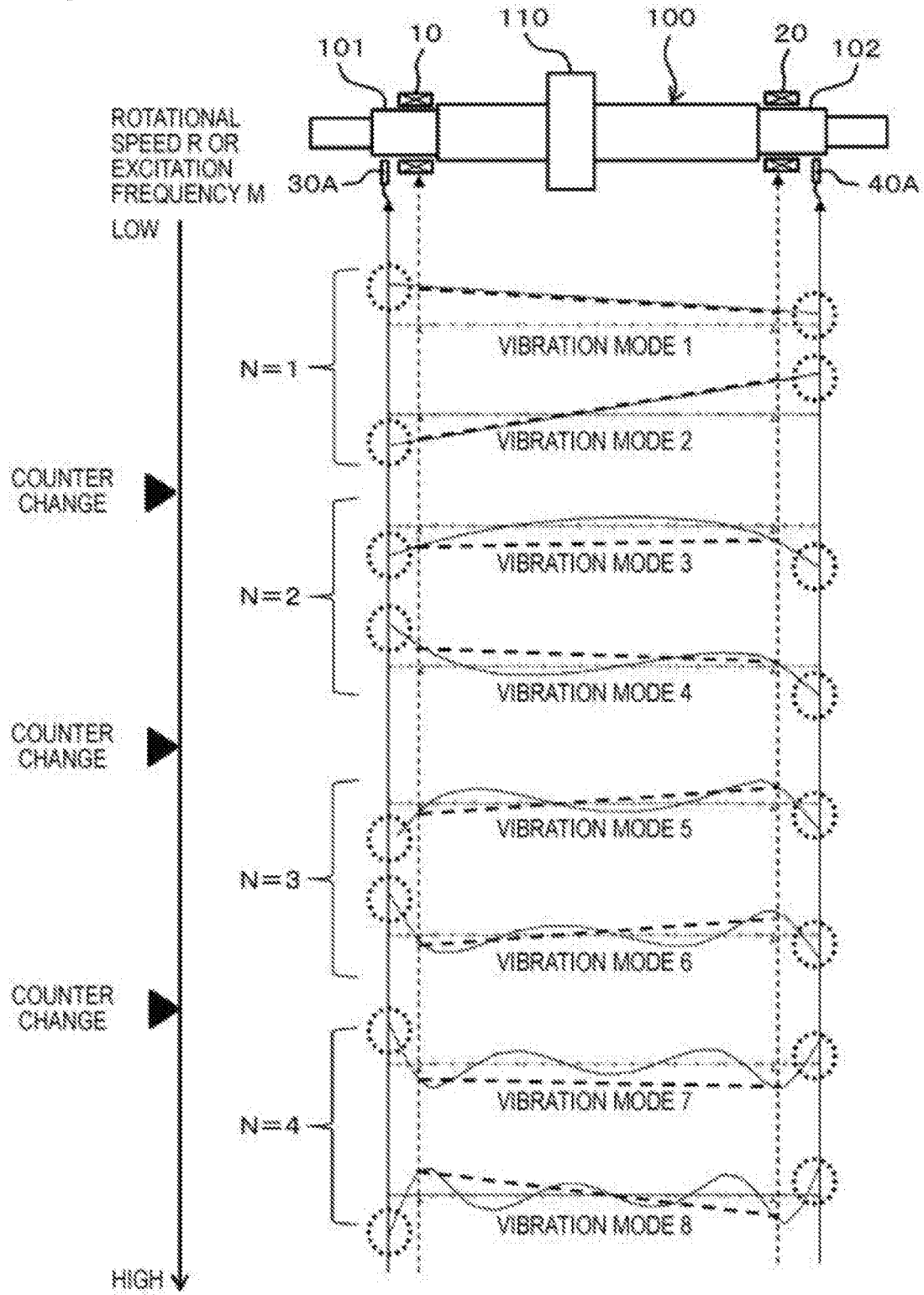

[FIG. 7]
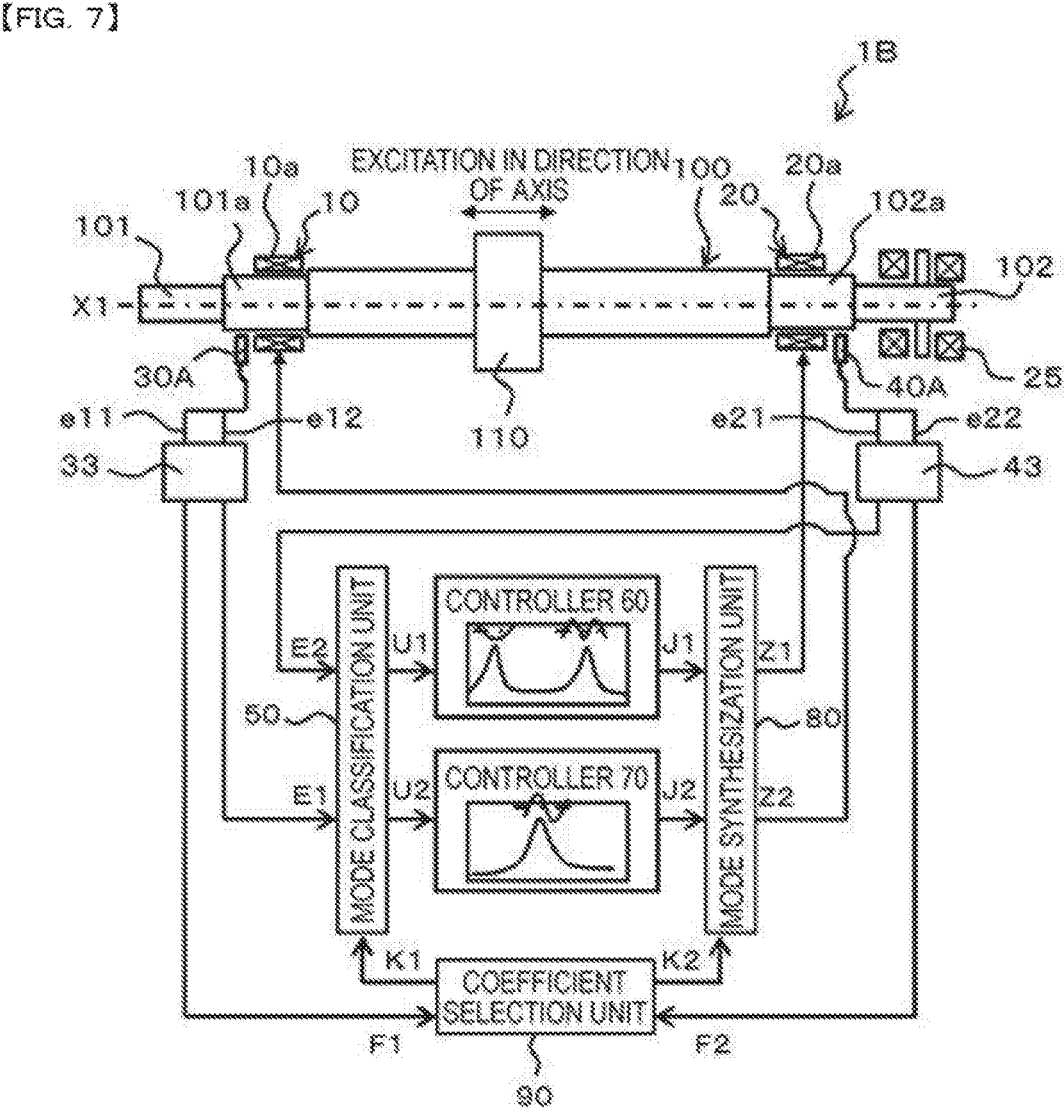

CONTROL DEVICE FOR MAGNETIC BEARING AND CONTROL METHOD

TECHNICAL FIELD

The present invention relates to a control device for a magnetic bearing and a control method.

BACKGROUND ART

In related art, active magnetic bearings that contactlessly support a rotor (shaft) are widely used. This magnetic bearing is controlled by a control device that controls the air gap between the magnetic bearing and the rotor to stably support the rotor.

A control device for a magnetic bearing is disclosed in JP-A-63-308215 (PTL 1) and JP-A-7-259853 (PTL 2).

CITATION LIST

Patent Literature

PTL 1: JP-A-63-308215
PTL 2: JP-A-7-259853

SUMMARY OF INVENTION

Technical Problem

The control device for a magnetic bearing disclosed in PTL 1 controls a rotor that is vibrated in a rigid body mode (from low speed to medium speed rotation) and is difficult to stably control a rotor that is vibrated in a higher-order bending mode (high speed rotation).

In the control device for a magnetic bearing disclosed in PTL 2, the rotor is stably supported by classifying the vibration modes of the rotor and performing control for each classified vibration mode. However, the control device disclosed in PTL 2 is based on the assumption that the position of the center of gravity in the direction of the rotation axis of the rotor is transversely symmetrical, and when the position of the center of gravity of the rotor in the rotational axis direction is transversely asymmetric, the vibration mode of the rotor cannot be properly classified, and it is difficult to stably support the rotor.

In particular, for a high-speed rotary machine such as a turbo compressor, the number of vibration modes of the rotor that rotates at high speed increases. Therefore, in the control device for a magnetic bearing that supports a rotor of a high-speed rotary machine contactlessly, it is desirable to perform stabilization design of the magnetic bearing by classifying the vibration modes of the rotor and reducing the load on the control device. However, as described above, when the vibration modes of the rotor cannot be properly classified, the load on the control device cannot be reduced, and it is difficult to perform the stabilization design of the magnetic bearing.

Accordingly, the present invention has been made in view of the above problems, and in a control device for a magnetic bearing, an object is to reduce the load on the control device and facilitate stabilization design of a magnetic bearing by reliably classifying the vibration modes of a rotor.

Solution to Problem

According to an aspect of the present invention, there is provided a control device for a magnetic bearing, which includes a magnetic bearing including electromagnets at one and the other end sides of a shaft member and supporting the one and the other end sides of the shaft member contactlessly by a magnetic attraction force of the electromagnets, and an inclination measuring device that measures a first inclination at the one end side of the shaft member and a second inclination at the other end side of the shaft member, and which controls the magnetic attraction force of the electromagnets based on the first inclination and the second inclination measured by the inclination measuring device.

Advantageous Effects of Invention

According to the present invention, it is possible to reduce load on a control device and facilitate stabilization design of a magnetic bearing by reliably classifying vibration modes of a rotor.

BRIEF DESCRIPTION OF DRAWINGS

FIG. 1 is a block diagram for explaining a control device for a magnetic bearing according to an embodiment.
FIG. 2 is a diagram for explaining an example of a vibration mode of a rotor.
FIG. 3 is a flowchart of an operation of the control device.
FIG. 4 is a flowchart of an operation of the control device.
FIG. 5 is a block diagram for explaining a control device according to a second embodiment.
FIG. 6 is a diagram for explaining an example of a vibration mode of a rotor according to the second embodiment.
FIG. 7 is a block diagram for explaining a control device according to a third embodiment.

DESCRIPTION OF EMBODIMENTS

Hereinafter, a control device 1 for a magnetic bearing according to an embodiment of the present invention will be described. FIG. 1 is a block diagram for explaining the control device 1 for a magnetic bearing according to an embodiment. In describing an embodiment, an example will be described, in which the control device for a magnetic bearing 1 is adapted for controlling magnetic bearings 10 and 20 that contactlessly support a rotor 100 that is in such a shape that a position of center of gravity is transversely asymmetric in a direction of rotation axis X1.

In the rotor 100, a magnet 101a is provided on a stepped portion formed at one end 101 side of the rotor 100 in the direction of rotation axis X1, and a magnet 102a is provided on a stepped portion formed at the other end 102 side of the rotor 100 in the direction of rotation axis X1.

The rotor 100 is provided with a disk 110 or a motor or the like at an intermediate position in the direction of the rotation axis X1. A length L1 in the direction of rotation axis X1 from the position of center of gravity G of the rotor 100 in the direction of rotation axis X1 to the magnetic bearing 10 (the stepped portion of the rotor 100 provided with the magnet 101a) is shorter than a length L2 in the direction of rotation axis X1 from the position of gravity center G of the rotor 100 in the direction of rotation axis X1 to the magnetic bearing 20 (the stepped portion of the rotor 100 provided with the magnet 102a) (L1<L2). Therefore, the position of center of gravity G of the rotor 100 in the direction of rotation axis X1 is transversely asymmetric, which is biased toward the one end 101 side in FIG. 1.

[Control Device for Magnetic Bearing]

As illustrated in FIG. 1, the control device 1 for a magnetic bearing (hereinafter simply referred to as "control device 1", in some cases) includes a magnetic bearing 10 that supports the one end 101 side of the rotor 100 contactlessly, a magnetic bearing 20 that supports the other end 102 side of rotor 100 contactlessly, displacement sensors 30 and 40, a mode classification unit 50, a parallel mode controller 60, a conical mode controller 70, a mode synthesization unit 80, and a coefficient selection unit 90.

The magnetic bearing 10 is provided on a radially outer side of the magnet 101a of the rotor 100. In the magnetic bearing 10, an electromagnet 10a (coil) is provided around the central axis (coaxial with the rotation axis X1 in FIG. 1) of the magnetic bearing 10, along a circumferential direction. The magnetic bearing 10 is an active magnetic bearing that supports the rotor 100 contactlessly with magnetic levitation by magnetic attraction (magnetic attraction force) between the electromagnet 10a and the magnet 101a of the rotor 100.

In the magnetic bearing 10, a predetermined air gap is provided between an inner diameter of the electromagnet 10a and an outer diameter of the magnet 101a of the rotor 100. In the magnetic bearing 20, the magnetic attraction force generated between the electromagnet 10a and the magnet 101a of the rotor 100 is controlled by the current flowing through the electromagnet 10a (coil) (control power Z1 supplied to the electromagnet 10a), and an air gap between the electromagnet 10a and the magnet 101a is specified.

The displacement sensor 30 is provided on the one end 101 side of the magnetic bearing 10. The displacement sensor 30 includes a first displacement sensor 31, a second displacement sensor 32, and an arithmetic unit 33.

The first displacement sensor 31 is provided at the one end 101 side of the rotor 100, and is outward (toward the one end 101 side) from the magnetic bearing 10 in the direction of the rotation axis X1. The first displacement sensor 31 is provided outwardly in the radial direction at a distance apart from the outer diameter of the rotor 100, and measures a radial displacement e11 orthogonal to the rotation axis X1 of the rotor 100.

The second displacement sensor 32 is provided in parallel at a distance apart from the first displacement sensor 31 in the direction of the rotation axis X1, and is inward (toward the other end 102 side) in the direction of rotation axis X1 from the first displacement sensor 31. The second displacement sensor 32 is also provided outwardly in the radial direction at a distance apart from the outer diameter of the rotor 100, and measures a radial displacement e12 orthogonal to the rotation axis X1 of the rotor 100.

The displacement e11 measured by the first displacement sensor 31 and the displacement e12 measured by the second displacement sensor 32 are calculated by the arithmetic unit 33.

The arithmetic unit 33 calculates, as a displacement E1, one of the radial displacement e11 measured by the first displacement sensor 31 and the radial displacement e12 measured by the second displacement sensor 32, and transmits the displacement E1 to the mode classification unit 50.

The arithmetic unit 33 calculates an inclination F1 at the one end 101 side of the rotor 100 from the radial displacement e11 measured by the first displacement sensor 31 and the radial displacement e12 measured by the second displacement sensor 32, and transmits the inclination F1 to the coefficient selection unit 90.

The magnetic bearing 20 is an active magnetic bearing that supports the other end 102 side of the rotor 100 with magnetic levitation by a magnetic attraction force. In the magnetic bearing 20, the magnetic attraction force generated between the electromagnet 20a and the magnet 102a of the rotor 100 is controlled by the current flowing through the electromagnet 20a (coil) (control power Z2 supplied to the electromagnet 20a), and an air gap between the magnet 102a and the electromagnet 20a is specified.

Since the structure for supporting the rotor 100 with the magnetic bearing 20 has substantially the same configuration as that of the magnetic bearing 10 described above, detailed description thereof is omitted.

A displacement sensor 40 is provided at the other end 102 side of the magnetic bearing 20. The displacement sensor 40 is provided at the other end 102 side of the rotor 100, and includes a first displacement sensor 41, a second displacement sensor 42, and an arithmetic unit 43.

The first displacement sensor 41 is provided outward (toward the other end 102 side) from the magnetic bearing 20 in the direction of rotation axis X1. The first displacement sensor 41 is provided outwardly in the radial direction at a distance apart from the outer diameter of the rotor 100, and measures a radial displacement e21 orthogonal to the rotor 100.

The second displacement sensor 42 is provided in parallel at a distance apart from the first displacement sensor 41 in the direction of the rotation axis X1, and is outward (toward the other end 102 side) from the first displacement sensor 41 in the direction of rotation axis X1. The second displacement sensor 42 is also provided outwardly in the radial direction at a distance apart from the rotor 100, and measures a radial displacement e22 orthogonal to the direction of the rotation axis X1 of the rotor 100.

The displacement e21 measured by the first displacement sensor 41 and the displacement e22 measured by the second displacement sensor 42 are calculated by the arithmetic unit 43.

The arithmetic unit 43 calculates, as a displacement e22, one of the radial displacement e21 measured by the first displacement sensor 41 and the radial displacement e22 measured by the second displacement sensor 42, and transmits the displacement e22 to the mode classification unit 50.

The arithmetic unit 43 calculates an inclination F2 at the other end 102 side of the rotor 100 from the radial displacement e21 measured by the first displacement sensor 41 and the radial displacement e22 measured by the second displacement sensor 42, and transmits the inclination F2 to the coefficient selection unit 90.

Here, the coefficient selection unit 90 selects a control parameter K1 for selecting a coefficient U used for vibration mode classification and a control parameter K2 for selecting a coefficient V used for vibration mode synthesization, based on the inclination F1 at the one end 101 side of the rotor 100 transmitted from the arithmetic unit 33 and the inclination F2 at the other end 102 side of the rotor 100 transmitted from the arithmetic unit 43.

Then, the coefficient selection unit 90 transmits the control parameter K1 to the mode classification unit 50, and transmits the control parameter K2 to the mode synthesization unit 80.

Next, the mode classification unit 50 sets a predetermined mode classification coefficient U and classifies vibration modes, based on the displacement E1 at the one end 101 side of the rotor 100 transmitted from the arithmetic unit 33, the displacement E2 at the other end 102 side of the rotor 100 transmitted from the arithmetic unit 43, and the control parameter K1 transmitted from the coefficient selection unit 90.

In an embodiment, the mode classification unit 50 outputs an input value U1 to the controller 60 when the vibration mode of the rotor 100 is the parallel mode (translation mode). The mode classification unit 50 outputs an input value U2 to the controller 70 when the vibration mode of the rotor 100 is the conical mode (inclination mode).

Here, the mode classification coefficient U is calculated in advance in a combination associated with an integer N (see FIG. 2) according to the vibration mode of the rotor 100 (vibration modes 1 to 8 in FIG. 2). The mode classification unit 50 sets a predetermined mode classification coefficient U according to the control parameter K1 determined by the coefficient selection unit 90 according to the vibration mode of the rotor 100.

Here, the parallel mode (translation mode) is a mode in which the rotor 100 is vibrated in a parallel state, and is in a state in which line segments connecting the one end 101 and the other end 102 of the rotor 100 in vibration (rotation) are parallel.

The conical mode (inclination mode) is a mode in which the rotor 100 is vibrated in an inclined state, and is a state in which line segments connecting the one end 101 and the other end 102 of the rotor 100 in vibration (rotation) are inclined.

The parallel mode controller 60 outputs, to the mode synthesization unit 80, an output value J1 for controlling the mode in which the vibration mode of the rotor 100 has a strong parallel mode motion.

The conical mode controller 70 outputs, to the mode synthesization unit 80, an output value J2 for controlling the mode in which the vibration mode of the rotor 100 has a strong conical mode motion.

Based on the control parameter K2 output from the coefficient selection unit 90, the mode synthesization unit 80 sets a mode synthesization coefficient V for synthesizing the output value J1 output from the parallel mode controller 60 and the output value J2 output from the conical mode controller 70, and synthesizes the vibration mode.

Then, the mode synthesization unit 80 generates the control power Z1 for controlling the magnetic bearing 10 and the control power Z2 for controlling the magnetic bearing 20 based on the output values J1 and J2 and the mode synthesization coefficient V, and transmits the control powers to the magnetic bearing 10 (electromagnet 10*a*) and the magnetic bearing 20 (electromagnet 20*a*), respectively.

Since the control powers Z1 and Z2 synthesized by the mode synthesization unit 80 are synthesized based on the output value J1 of the parallel mode controller 60 and the output value J2 of the conical mode controller 70, the control powers Z1 and Z2 are the control powers suitable for a vibration mode that has a strong parallel mode motion of the rotor 100 or for a vibration mode that has a strong conical mode motion of the rotor 100.

In the magnetic bearings 10 and 20, air gaps between the electromagnet 10*a* and the magnet 101*a* of the rotor 100 and between the electromagnet 20*a* and the magnet 102*a* of the rotor 100 are appropriately controlled by the control powers Z1 and Z2 generated by the mode synthesization unit 80, which are suitable for the vibration mode that has the strong parallel mode motion of the rotor 100 or for the vibration mode that has the strong conical mode motion of the rotor 100.

[Vibration Mode]

Next, the vibration mode of the rotor 100 will be described. FIG. 2 is a diagram for explaining an example of the vibration mode of the rotor 100.

As illustrated in FIG. 2, the rotor 100 has a unique vibration mode based on the material, shape, and the like. FIG. 2 illustrates an example in which the vibration mode changes from 1 to 8 as the vibration frequencies of the rotor 100 increases from lower to higher vibration frequencies.

In an embodiment, in the rotor 100, the disk 110 is provided at a position asymmetric in the direction of the rotation axis X1, and the position of center of gravity G of the rotor 100 in the direction of the rotation axis X1 is transversely asymmetric, that is, biased toward the one end 101 side in FIG. 2, and accordingly, the vibration mode of the rotor 100 is also transversely asymmetric. Since the vibration frequency of the rotor 100 changes in conjunction with the rotational speed of the rotor 100, in the following description, unless the vibration frequency of the rotor 100 and the rotational speed of the rotor 100 are specifically distinguished, the word vibration frequency of the rotor 100 or rotational speed of the rotor 100 will be used.

As illustrated in FIG. 2, the vibration mode 1 of the rotor 100 is the parallel mode, in which the vibration frequency of the rotor 100 is low, and the rotor 100 is vibrated in a rigid body state and also the rotor 100 is vibrated in a parallel state.

The inclination F1 of the one end 101 of the rotor 100 is a difference (e11−e12) between the displacement e11 of the rotor 100 measured by the first displacement sensor 31 and the displacement e12 at the one end 101 side of the rotor 100 measured by the second displacement sensor 32.

Here, in the vibration mode 1, since the displacement e11>the displacement e12 of the rotor 100, the inclination F1 (e11−e12) at the one end 101 side of the rotor 100 is >0.

The inclination F2 of the other end 102 of the rotor 100 is a difference (e21−e22) between the displacement e21 of the rotor 100 measured by the first displacement sensor 41 and the displacement e22 of the rotor 100 measured by the second displacement sensor 42.

Here, in the vibration mode 1, since the displacement e21>the displacement e22 of the rotor 100, the inclination F2 (e21−e22) at the other end 102 side of the rotor 100 is >0.

Therefore, in the vibration mode 1, the inclination F1 (e11−e12) at the one end 101 side and the inclination F2 (e21−e22) at the other end 102 side of the rotor 100 are inclinations in the same direction (F1>0, F2>0).

The vibration mode 2 is also the conical mode, in which the vibration frequency of the rotor 100 is low, and the rotor 100 is vibrated in a rigid state and also the rotor 100 is vibrated in an inclined state. As illustrated in FIG. 2, in the vibration mode 2, since the displacement e11<displacement e12 of the rotor 100, the inclination F1 (e11−e12) at the one end 101 side of the rotor 100 is <0, and since the displacement e21<displacement e22 of the rotor 100, the inclination F2 (e21−e22) at the other end 102 side of the rotor 100 is <0.

Therefore, in the vibration mode 2, the inclination F1 (e11−e12) at the one end 101 side and the inclination F2 (e21−e22) at the other end 102 side of the rotor 100 are inclinations in the same direction (F1<0, F2<0).

The vibration mode 3 is the parallel mode, in which the vibration frequency of the rotor 100 is high, and the rotor 100 is vibrated in a bent state and also the rotor 100 is vibrated in a parallel state. As illustrated in FIG. 2, in the vibration mode 3, since the displacement e11<displacement e12 of the rotor 100, the inclination F1 (e11−e12) at the one end 101 side of the rotor 100 is <0, and since the displacement e21>displacement e22 of the rotor 100, the inclination F2 (e21−e22) at the other end 102 side of the rotor 100 is >0.

Therefore, in the vibration mode 3, the inclination F1 (e11−e12) at the one end 101 side and the inclination F2 (e21−e22) at the other end 102 side of the rotor 100 are inclinations in opposite directions (F1<0, F2>0).

The vibration mode 4 is the conical mode, in which the vibration frequency of the rotor 100 is increased, and the rotor 100 is vibrated in a bent state and also the rotor 100 is vibrated in an inclined state. As illustrated in FIG. 4, in the vibration mode 4, since the displacement e11>displacement e12 of the rotor 100, the inclination F1 (e11−e12) at the one end 101 side of the rotor 100 is >0, and since the displacement e21>displacement e22 of the rotor 100, the inclination F2 (e21−e22) at the other end 102 side of the rotor 100 is >0.

Therefore, in the vibration mode 4, the inclination F1 (e11−e12) at the one end 101 side and the inclination F2 (e21−e22) at the other end 102 side of the rotor 100 are inclinations in the same direction (F1>0, F2>0).

The vibration mode 5 is the parallel mode, in which the vibration frequency of the rotor 100 is high, and the rotor 100 is vibrated in a bent state and also the rotor 100 is vibrated in a parallel state. As illustrated in FIG. 2, in the vibration mode 5, since the displacement e11<displacement e12 of the rotor 100, the inclination F1 (e11−e12) at the one end 101 side of the rotor 100 is <0, and since the displacement e21>displacement e22 of the rotor 100, the inclination F2 (e21−e22) at the other end 102 side of the rotor 100 is >0.

Therefore, in the vibration mode 5, the inclination F1 (e11−e12) at the one end 101 side and the inclination F2 (e21−e22) at the other end 102 side of the rotor 100 are inclinations in opposite directions (F1<0, F2>0).

The vibration mode 6 is the conical mode, in which the vibration frequency of the rotor 100 is increased, and the rotor 100 is vibrated in a bent state and also the rotor 100 is vibrated in an inclined state. As illustrated in FIG. 2, in the vibration mode 6, since the displacement e11>displacement e12 of the rotor 100, the inclination F1 (e11−e12) at the one end 101 side of the rotor 100 is >0, and since the displacement e21>displacement e22 of the rotor 100, the inclination F2 (e21−e22) at the other end 102 side of the rotor 100 is >0.

Therefore, in the vibration mode 6, the inclination F1 (e11−e12) at the one end 101 side and the inclination F2 (e21−e22) at the other end 102 side of the rotor 100 are inclinations in the same direction (F1>0, F2>0).

The vibration mode 7 is the parallel mode, in which the vibration frequency of the rotor 100 is high, and the rotor 100 is vibrated in a bent state and also the rotor 100 is vibrated in a parallel state. As illustrated in FIG. 7, in the vibration mode 7, since the displacement e11>displacement e12 of the rotor 100, the inclination F1 (e11−e12) at the one end 101 side of the rotor 100 is >0, and since the displacement e21<displacement e22 of the rotor 100, the inclination F2 (e21−e22) at the other end 102 side of the rotor 100 is <0.

Therefore, in the vibration mode 7, the inclination F1 (e11−e12) at the one end 101 side and the inclination F2 (e21−e22) at the other end 102 side of the rotor 100 are inclinations in opposite directions (F1>0, F2<0).

The vibration mode 8 is the conical mode, in which the vibration frequency of the rotor 100 is high, and the rotor 100 is vibrated in a bent state and also the rotor 100 is vibrated in an inclined state. As illustrated in FIG. 2, in the vibration mode 8, since the displacement e11<displacement e12 of the rotor 100, the inclination F1 (e11−e12) at the one end 101 side of the rotor 100 is <0, and since the displacement e21<displacement e22 of the rotor 100, the inclination F2 (e21−e22) at the other end 102 side of the rotor 100 is <0.

Therefore, in the vibration mode 8, the inclination F1 (e11−e12) at the one end 101 side and the inclination F2 (e21−e22) at the other end 102 side of the rotor 100 are inclinations in the same direction (F1<0, F2<0).

Thus, in the rotor 100, except for the vibration mode 1, the vibration mode (vibration modes 2, 4, 6, and 8) in which the inclination F1 at the one end 101 side and the inclination F2 at the other end 102 side of the rotor 100 are in the same direction, and the vibration mode (vibration modes 3, 5, and 7) in which the inclination F1 at the one end 101 side and the inclination F2 at the other end 102 side of the rotor 100 are in the opposite directions, occur alternately according to the vibration frequency (rotational speed) of the rotor 100.

The vibration modes 2, 4, 6, and 8 in which the inclination F1 at the one end 101 side and the inclination F2 at the other end 102 side of the rotor 100 are in the same direction are conical modes in which the rotor 100 is vibrated in an inclined state. Then, the vibration modes 3, 5, and 7 in which the inclination F1 at the one end 101 side and the inclination F2 at the other end 102 side of the rotor 100 are in the opposite directions are parallel modes in which the rotor 100 is vibrated in a parallel state.

In this example, as illustrated in FIG. 2, in the rotor in which the position of the center of gravity of the rotor in the direction of rotation axis is transversely asymmetric, even when the vibration mode is actually the parallel mode, there is a case where the motion is in the conical mode in which the line segment connecting the one end 101 side and the other end 102 side of the rotor 100 is vibrated while being inclined, and accordingly, it is difficult to accurately classify the vibration mode of the transversely asymmetric rotor into the parallel mode and the conical mode.

As a result of earnest research, the inventor of the present application found that, once the inclination F1 at the one end 101 side and the inclination F2 at the other end 102 side of the rotor 100 are measured, the parallel mode and the conical mode can be accurately classified based on the measured inclinations F1 and F2.

As illustrated in FIG. 2, in an embodiment, when the rotational speed of the rotor 100 is increased, if the directions of the inclination F1 at the one end 101 side and the inclination F2 at the other end 102 side of the rotor 100 are changed from the same direction to the opposite directions, the control device 1 may determine that the vibration mode is changed from the conical mode (inclination mode) to the parallel mode (translation mode).

When the rotational speed of the rotor 100 is reduced, if the directions of the inclination F1 at the one end 101 side and the inclination F2 at the other end 102 side of the rotor 100 are changed from the opposite directions to the same direction, the control device 1 may determine that the vibration mode is changed from the parallel mode (translation mode) to the conical mode (inclination mode).

As illustrated in FIG. 2, in the control device 1, starting from the lower vibration frequency of the rotor 100, (1) integer N=1 is set for a combination of vibration mode 1 (parallel mode) and vibration mode 2 (conical mode), (2) integer N=2 is set for a combination of vibration mode 3 (parallel mode) and vibration mode 4 (conical mode), (3) integer N=3 is set for a combination of vibration mode 5 (parallel mode) and vibration mode 6 (conical mode), and (4) integer N=4 is set for a combination of vibration mode 7 (parallel mode) and vibration mode 8 (conical mode).

As described above, the parallel mode and the conical mode of the rotor 100 are set as one set, then integer N=1 to 4 is set for each set, and then the mode classification coefficients U and the mode synthesization coefficients V are calculated in advance for these combinations of modes. Then, based on the values of the inclinations F1 and F2 of the rotor 100, by setting again the mode classification coefficient U of the integer N corresponding to the control parameter K1 determined by the coefficient selection unit 90, the vibration mode of the transversely asymmetric rotor 100 may be reliably classified into the parallel mode and the conical mode.

Therefore, the displacement of the magnetic bearings 10 and 20 that contactlessly support the rotor 100 may be processed individually by the parallel mode controller 60 or the conical mode controller 70. As a result, in the control device 1, the processing load on each of the controllers 60 and 70 may be reduced, thereby facilitating the stabilization design of the magnetic bearing.

[Control Method of Magnetic Bearing]

Next, the control method of the magnetic bearings 10 and 20 by the control device 1 will be described. FIG. 3 is a flowchart illustrating the control method of the magnetic bearing by the control device, and illustrates an example in which the rotational speed of the rotor 100 is gradually increased.

As illustrated in FIG. 3, at step S101, the vibration mode of the rotor 100 is measured in advance. In an embodiment, the vibration modes 1 to 8 of the rotor 100 illustrated in FIG. 2 are measured (acquired) in advance. The measurement of the vibration mode of the rotor 100 may be calculated by numerical analysis such as a finite element method, or may be measured by an impact test or the like.

Next, at step S102, the mode classification coefficient U and the mode synthesization coefficient V of each of the vibration modes 1 to 8 are calculated, then the mode classification coefficient U is set in the mode classification unit 50, and the mode synthesization coefficient V is set in the mode synthesization unit 80. In an embodiment, in an order from the lower rotational speed of the rotor 100, two of the vibration modes are combined (for example, vibration modes 1 and 2, vibration modes 3 and 4, vibration modes 5 and 6, and vibration modes 7 and 8), and the mode classification coefficient U and the mode synthesization coefficient V are calculated for each combination (integers 1 to 4).

At step S103, the coefficient selection unit 90 sets the counter i=1 and sets the control parameters K1 and K2.

At step S104, the control device 1 increases the rotational speed of the rotor 100.

At step S105, the control device 1 calculates the inclination F1 at the one end 101 side and the inclination F2 at the other end 102 side of the rotor 100 based on the measurement result of the displacement e11 at the one end 101 side and the displacement e12 at the other end 102 side of the rotor 100 by the displacement sensor 30, and the displacement e21 at the one end 101 side and the displacement e22 at the other end 102 side of the rotor 100 by the displacement sensor 40.

At step S106, the coefficient selection unit 90 determines whether or not the inclination F1 at the one end 101 side and the inclination F2 at the other end 102 side of the rotor 100 calculated at step S105 are in opposite directions.

When determining that the inclination F1 and the inclination F2 are in opposite directions (step S106: YES), the coefficient selection unit 90 proceeds to step S107, adds 1 to the counter i (i=i+1), and sets the control parameters K1, K2. When determining that the inclinations F1 and F2 are not in the opposite directions (step S106: NO), the coefficient selection unit 90 proceeds to step S108 without changing the value of the counter i.

At step S108, the mode classification unit 50 selects the mode classification coefficient U based on the control parameter K1 of the coefficient selection unit 90 corresponding to the counter i (i=1 to 4), and outputs the input value U1 to the parallel mode controller 60 or outputs the input value U2 to the conical mode controller 70. The mode synthesization unit 80 selects the mode synthesization coefficient V based on the control parameter K2 of the coefficient selection unit 90.

At step S109, the control device 1 synthesizes the output value J1 of the parallel mode controller 60 and the output value J2 of the conical mode controller 70 based on the mode synthesization coefficient V selected by the mode synthesization unit 80 to generate control powers Z1 and Z2. These control powers Z1 and Z2 are output to the magnetic bearings 10 and 20.

At step S110, the control device 1 determines whether or not the rotational speed of the rotor 100 is the rated rotational speed. When determining that the rotational speed of the rotor 100 is the rated rotational speed (step S110: YES), the control device 1 ends the control processing for the magnetic bearings 10 and 20, and when determining that the rotational speed is not the rated rotational speed (step S110: NO), the control device returns the processing to step S104, and performs the process of increasing the rotational speed of the rotor 100.

Next, a control method of the magnetic bearings 10 and 20 by the control device 1 when the rotational speed of the rotor 100 is decreased will be described. FIG. 4 is a flowchart illustrating the control method of the magnetic bearing by the control device, which illustrates an example in which the rotational speed of the rotor 100 is gradually decreased.

Likewise step S101 described above, the control device 1 measures the vibration mode (vibration modes 1 to 8) of the rotor 100 (step S201), and then likewise step S102, the control device 1 calculates the mode classification coefficient U and the mode synthesization coefficient V of each of the vibration modes 1 to 8 (step S202), and then sets the mode classification coefficient U in the mode classification unit 50, and then sets the mode synthesization coefficient V in the mode synthesization unit 80.

Then, the coefficient selection unit 90 sets the counter i=N (step S203), and then decreases the rotational speed of the rotor 100 (step S204).

Likewise step S105, the control device 1 calculates the inclination F1 at the one end 101 side and the inclination F2 at the other end 102 side of the rotor 100 (step S205), and then the coefficient selection unit 90 determines whether or not the directions of the inclination F1 and the inclination F2 are in the same direction (step S206). When it is determined that the inclination directions are in the same direction (step S206: YES), the coefficient selection unit 90 subtracts 1 from the counter i (step S207), and when it is determined that the inclination directions are not in the same direction (step S206: NO), the coefficient selection unit 90 proceeds to step S208 without changing the value of the counter i.

At step S208, the mode classification unit 50 selects the mode classification coefficient U based on the control parameter K1 of the coefficient selection unit 90, and outputs the input value U1 to the parallel mode controller 60 or outputs the input value U2 to the conical mode controller 70.

The mode synthesization unit 80 sets the mode synthesization coefficient V based on the control parameter K2 of the coefficient selection unit 90.

At step S209, the control device 1 synthesizes the output value J1 of the parallel mode controller 60 and the output value J2 of the conical mode controller 70 based on the mode synthesization coefficient V set by the mode synthesization unit 80 to generate control powers Z1 and Z2. These control powers Z1 and Z2 are output to the magnetic bearings 10 and 20.

At step S210, when the rotational speed of the rotor 100 is 0 (zero) (step S210: YES), the control device 1 ends the processing of controlling the magnetic bearings 10 and 20 and rotates the rotor 100, and, when the number is not 0 (zero) (step S210: NO), the control device 1 returns the processing to step S204 and decreases the rotational speed of the rotor 100.

As described above, according to an embodiment, a configuration is provided, which includes (1) magnetic bearings 10 and 20 including electromagnets 10a and 20a provided at one end 101 and the other end 102 of a rotor 100 (shaft member) and supporting the one end 101 and the other end 102 of the rotor 100 contactlessly by the magnetic attraction forces of the electromagnets 10a and 20a; and displacement sensors 30 and 40 (inclination measuring device) that measure the inclination F1 (first inclination) at the one end 101 of the rotor 100 and the inclination F2 (second inclination) at the other end 102 of the rotor 100, in which the magnetic attraction forces of the electromagnets 10a and 20a are controlled based on the inclinations F1 and F2 measured by the displacement sensors 30 and 40.

With such configuration, the control device 1 can measure the inclination F1 at the one end 101 side and the inclination F2 at the other end 102 side of the rotor 100 by the displacement sensors 30 and 40, and can appropriately control the magnetic attraction force of the magnetic bearings 10 and 20 that contactlessly support the one end 101 side and the other end 102 side of the rotor 100 based on these inclinations F1 and F2. Therefore, the control device 1 can easily control the magnetic attraction force of the magnetic bearings 10 and 20 based on the inclination F1 at the one end 101 side and the inclination F2 at the other end 102 side of the rotor 100, and accordingly, the burden on the control device 1 is reduced, thereby facilitating the stabilization design of the magnetic bearings 10 and 20.

(2) The displacement sensors 30 and 40 include a first displacement sensor 31 provided at the one end 101 side of the rotor 100 and a second displacement sensor 32 provided adjacent to the first displacement sensor 31 in the direction of the rotation axis X1 of the rotor 100, and a first displacement sensor 41 (third displacement sensor) provided at the other end 102 side of the rotor 100 and a second displacement sensor 42 (fourth displacement sensor) provided adjacent to the first displacement sensor 41 in the direction of the rotation axis X1 of the rotor 100.

With such configuration, in the control device 1, since two displacement sensors (first displacement sensor 31 and second displacement sensor 32, first displacement sensor 41 and second displacement sensor 42) are respectively provided on the rotor 100 in parallel in the direction of the rotation axis X1 thereof, the inclination F1 at the one end 101 side and the inclination F2 at the other end 102 side of the rotor 100 based on each of these two displacement sensors can be measured with a simple configuration with higher accuracy.

(3) The displacement sensors 30 and 40 have arithmetic units 33 and 43, respectively, in which the arithmetic unit 33 is configured to calculate the inclination F1 at the one end 101 side of the rotor 100 based on the displacement e11 (first displacement) of the rotor 100 measured by the first displacement sensor 31 and the displacement e12 (second displacement) of the rotor 100 measured by the second displacement sensor 32, and the arithmetic unit 43 is configured to calculate the inclination F2 at the other end 102 side of the rotor 100 based on the displacement e21 (third displacement) of the rotor 100 measured by the first displacement sensor 41 and the displacement e22 (fourth displacement) of the rotor 100 measured by the second displacement sensor 42.

With such configuration, in the control device 1, the arithmetic unit 33 included in the displacement sensor 30 can easily calculate the inclination F1 at the one end 101 side based on the displacements e11 and e12 at the one end 101 side of the rotor 100 measured by the displacement sensor 30. The arithmetic unit 43 included in the displacement sensor 40 can easily calculate the inclination F2 at the other end 102 side based on the displacements e21 and e22 at the other end 102 side of the rotor 100 measured by the displacement sensor 40. Therefore, the control device 1 can reliably control the magnetic attraction force of the magnetic bearings 10 and 20 that contactlessly support the one end 101 side and the other end 102 side of the rotor 100 based on these inclinations F1 and F2.

(4) A configuration is provided, which includes a mode classification unit 50 (mode classification device) that classifies vibration modes 1 to 8 unique to the rotor 100 based on the control parameter K1 (first control parameter), a parallel mode controller 60 and a conical mode controller 70 (a plurality of controllers) that generate control powers Z1 and Z2 to be supplied to the electromagnets 10a and 20a according to the classified vibration modes 1 to 8, a mode synthesization unit 80 (mode synthesization device) that synthesizes the output value J1 (control power) generated by the parallel mode controller 60 and the conical mode controller 70 based on the control parameter K2 (second control parameter), and a coefficient selection unit 90 (control parameter setting unit) that sets the control parameter K1 and the control parameter K2 based on the inclination F1 at the one end 101 side of the rotor 100 and the inclination F2 at the other end 102 side of the rotor 100.

With such configuration, in the control device 1, the vibration modes 1 to 8 unique to the rotor 100 are classified by the mode classification unit 50 and input to the controller corresponding to each vibration mode for processing. As a result, the processing load on each controller (parallel mode controller 60 and conical mode controller 70) is reduced, thereby facilitating the stabilization design of the magnetic bearings 10 and 20.

(5) The coefficient selection unit 90 is configured such that, when the inclination F1 at the one end 101 side of the rotor 100 and the inclination F2 at the other end 102 side of the rotor 100 are in the same direction (F1>0, F2>0 or F1<0, F2<0) or in the opposite directions (F1>0, F2<0 or F1<0, F2>0), the control parameter K1 and the control parameter K2 are changed according to the vibration modes 1 to 8.

With such configuration, the control parameters K1 and K2 used to classify the vibration modes of the rotor 100 can be appropriately set based on the directions of the inclination F1 at the one end 101 side and the inclination F2 at the other end 102 side of the rotor 100, and as a result, the vibration mode of the rotor 100 can be reliably classified.

(6) A configuration is provided, in which the first displacement sensor 31 and the second displacement sensor 32 are provided outward (toward one end 101 side) in the direction of rotation axis X1 from the magnetic bearing 10 that contactlessly supports the one end 101 side of the rotor 100, and the first displacement sensor 41 and the second displacement sensor 42 are provided outward (toward the other end 102 side) in the direction of rotation axis X1 from the magnetic bearing 20 that contactlessly supports the other end 102 side of the rotor 100.

With such configuration, the first displacement sensor 31 and the second displacement sensor 32, which are otherwise provided in the one end 101 side, and the first displacement sensor 41 and the second displacement sensor 42, which are otherwise provided in the other end 102 side of the rotor 100, are provided in the vicinity of both ends of the rotor 100. Therefore, it is possible to measure the displacements on the end portions 101 and 102 side of the rotor 100 with higher accuracy than when the displacement sensors 31, 32, 41 and 42 are provided on the center side of the rotor 100.

(7) A configuration is provided, in which vibration modes 1 to 8 unique to the rotor 100 include a parallel mode in which the rotor 100 is vibrated in a parallel state, and a conical mode in which the rotor 100 is vibrated in an inclined state, and the mode separation unit 50 classifies the unique vibration modes 1 to 8 into either the parallel mode or the conical mode based on the control parameter K1.

With such configuration, the control device 1 can reliably classify the vibration modes 1 to 8 of the rotor 100 into either the parallel mode or the conical mode.

(8) The rotor 100 is configured such that the position of the center of gravity of the rotor 100 in the direction of the rotation axis X1 is asymmetric.

With this configuration, the vibration modes of the rotor 100 with the transversely asymmetric center of gravity in the direction of the rotation axis X1 can be reliably classified, and input to a controller suitable for each vibration mode. Therefore, the load on each controller can be reduced, thereby facilitating the stabilization design of the magnetic bearings 10 and 20.

Second Embodiment

Next, a second embodiment of the present invention will be described. FIG. 5 is a block diagram for explaining a control device 1A according to the second embodiment. In the control device LA according to the second embodiment, the rotational speed R (rotational frequency) or the excitation frequency M of the rotor 100 is input to the coefficient selection unit 90, and the coefficient selection unit 90 sets the control parameters K1 and K2 based on the rotational speed R (rotational frequency) or the excitation frequency M of the rotor 100.

Therefore, in the control device LA, there is no need to measure the inclinations F1 and F2 of the rotor 100 with the two displacement sensors provided at the one end 101 and the other end 102 of the rotor 100, and accordingly, the displacement sensor 30A and the displacement sensor 40A have only one first displacement sensor 31 and one first displacement sensor 41, respectively.

In the control device 1A, the same configurations as those of the control device 1 of the embodiment described above are denoted by the same reference numerals, and will be described as necessary.

As illustrated in FIG. 5, the control device 1A is configured such that either the rotational speed R (rotational frequency) or the excitation frequency M of the rotor 100 is input to the coefficient selection unit 90.

The coefficient selection unit 90 sets the control parameter K1 to be transmitted to the mode classification unit 50 and the control parameter K2 to be transmitted to the mode synthesization unit 80 based on the value of the rotational speed R (rotational frequency) or the excitation frequency M of the rotor 100, and transmits the control parameters K1 and K2 to the mode classification unit 50 and the mode synthesization unit 80, respectively.

The mode classification unit 50 selects the mode classification coefficient U based on the control parameter K1. The mode synthesization unit 80 selects the mode synthesization coefficient V based on the control parameter K2.

Next, the vibration mode of the rotor 100 in the second embodiment will be described. FIG. 6 is a diagram for explaining an example of a vibration mode of the rotor 100 according to the second embodiment.

As illustrated in FIG. 6, in the control device LA, the relationship between the rotational speed R (or excitation frequency M) of the rotor 100 and the integer N is determined in advance, and a predetermined integer N is selected based on the rotational speed R (or excitation frequency) of the rotor 100 input to the coefficient selection unit 90, and a control parameter K1 and a control parameter K2 are set.

As a result, in the control device LA, the integer N is selected based on the rotational speed R (or excitation frequency M) of the rotor 100, and the mode classification coefficient U and the mode synthesization coefficient V according to the vibration modes 1 to 8 can be set. Therefore, the control device 1 can reliably classify the vibration mode into the parallel mode and the conical mode based on the rotational speed R (or excitation frequency M) of the rotor 100.

As described above, according to the embodiment, (9) a configuration is provided, which includes a mode classification unit 50 that classifies the unique vibration modes 1 to 8 of the rotor 100 based on the control parameter K1, a parallel mode controller 60 and a conical mode controller 70 (a plurality of controllers) that generates output values J1 and J2 (control power) to be supplied to the electromagnets 10a and 20a according to the classified vibration modes 1 to 8, a mode synthesization unit 80 that synthesizes the output values J1 and J2 generated by the parallel mode controller 60 and the conical mode controller 70 based on the control parameter K2, and a coefficient selection unit 90 that sets the control parameters K1 and K2 based on the rotational speed R or the excitation frequency M of the rotor 100.

With such configuration, the coefficient selection unit 90 sets the control parameters K1 and K2 based on the rotational speed R or the excitation frequency M of the rotor 100. Therefore, in the control device LA, since there is no need to calculate the inclinations F1 and F2 of the rotor 100 by the displacement sensors 30A and 40A, the displacement sensors 30A and 40A only need to include at least one displacement sensor (first displacement sensors 31 and 41 or second displacement sensors 32 and 42).

Therefore, in the control device 1A, the number of displacement sensors can be reduced, the manufacturing cost can be reduced, and the displacement sensor can be provided in a narrow space, thereby increasing the design flexibility of the displacement sensor.

Third Embodiment

Next, a control device 1B according to a third embodiment will be described. FIG. 7 is a block diagram for explaining a control device 1B according to the third embodiment.

The control device 1B according to the third embodiment is different from the embodiments described above in that the rotor 100 is provided movable in the axial direction of the rotation axis X1. The same configurations as those of the control device 1 of the embodiment described above are denoted by the same reference numerals, and will be described as necessary.

As illustrated in FIG. 7, in the control device 1B, the other end 102 side of the rotor 100 is supported by the magnetic bearing 20 and a thrust bearing 25.

The displacement sensor 30A includes a first displacement sensor 31 provided at the one end 101 side of the rotor 100, that is, at the one end 101 side of the magnetic bearing 10 (outer side in the direction of the rotation axis X1 of the rotor 100).

The displacement sensor 40A includes a first displacement sensor 41 provided at the other end 102 side of the rotor 100, that is, at the other end 102 side of the magnetic bearing 20 (outer side in the direction of the rotation axis X1 of the rotor 100).

The thrust bearing 25 is provided at the outer side of the displacement sensor 40A in the direction of the rotation axis X1. The thrust bearing 25 supports the other end 102 of the rotor 100 to be rotatable around the rotation axis X1 and to be slidable in the direction of the rotation axis X1.

The thrust bearing 25 supports the rotor 100 to be movable between a reference position (not illustrated) and a slide position (not illustrated) in the direction of the rotation axis X1. The sliding mechanism of the rotor 100 by the thrust bearing 25 forms the sliding mechanism of the present invention.

Therefore, in the control device 1B, the displacement e11 at the one end 101 side and the displacement e21 at the other end 102 side of the rotor 100 are measured at a reference position, and then the rotor 100 is slid to the slide position in the direction of the rotation axis X1. Then, the displacement e12 at the one end 101 side and the displacement e22 at the other end 102 side of the rotor 100 are measured at the slide position to which the rotor 100 has been slid.

Therefore, in the control device 1B, the rotor 100 is slid between the reference position and the slide position in the direction of the rotation axis X1, so that, with one displacement sensor, two displacements e11 and e12 at the one end 101 side and two displacements e21 and e22 at the other end 102 side of the rotor 100 can be measured.

As a result, in the control device 1B, the inclinations F1 and F2 can be calculated from the two displacements e11 and e12 at the one end 101 side and the two displacements e21 and e22 at the other end 102 side of the rotor 100, and the vibration mode can be reliably classified into the parallel mode and the conical mode based on the inclinations F1 and F2.

As described above, according to the embodiment, (10) A configuration is provided, in which the displacement sensors 30A and 40A include the first displacement sensor 31 that measures the displacement e11 at the one end 101 side of the rotor 100, and the first displacement sensor 41 that measures the displacement e21 at the other end 102 side of the rotor 100, and further include the thrust bearing 25 (slide mechanism) that moves the rotor 100 between the reference position (first position) and the slide position (second position) in the direction of the rotation axis X1, and, in which the arithmetic unit 33 calculates the inclination F1 at the one end 101 side of the rotor 100 based on the displacement e11 (fifth displacement) at the reference position of the rotor 100, and the displacement e12 (sixth displacement) at the movement position measured by the displacement sensor 31, and also the arithmetic unit 43 calculates the inclination F2 at the other end 102 side of the rotor 100 based on the displacement e21 (seventh displacement) at the reference position and the displacement e22 (eighth displacement) at the movement position of the rotor 100 measured by the first displacement sensor 41.

With such configuration, by moving the rotor 100 in the direction of the rotation axis X1 using the thrust bearing 25, two displacements e11, e12 and e21, e22 of the rotor 100 can be measured with one single first displacement sensor 31 and 41 provided at one end 101 side and the other end 102 side of the rotor 100, respectively. Then, the arithmetic units 33 and 43 can calculate the inclination F1 at the one end side 101 and the inclination F2 at the other end 102 side of the rotor 100 from these displacements e11, e12 and e21, e22. Even such, in the control device 1B, again, the number of displacement sensors can be reduced, the manufacturing cost can be reduced, and the displacement sensor can be provided in a narrow space, thereby increasing the design flexibility of the displacement sensor.

Note that, in the embodiments described above, the cases have been described by way of example, in which the vibration mode of the rotor 100 with a transversely asymmetric position of center of gravity in the direction of the rotation axis X1 is reliably classified, but the control devices 1 to 1B may also be applied to a roller with a transversely symmetric position of center of gravity in the direction of the rotation axis X1.

Note that, in the embodiments described above, the cases have been described by way of example, in which the vibration mode of the rotor 100 is the vibration modes 1 to 8 of either the parallel mode or the conical mode, but the vibration mode of the rotor 100 is not limited thereto. For example, the number of vibration modes may be smaller or larger, and may be a mode other than the parallel mode or the conical mode.

Note that, in the embodiments, the cases have been described by way of example, in which the displacement sensor 30 (the first displacement sensor 31 and the second displacement sensor 32) is preferably provided outward (toward the one end 101 side) from the magnetic bearing 10 in the direction of the rotation axis X1 of the rotor 100, and the displacement sensor 40 (the first displacement sensor 41 and the second displacement sensor 42) is preferably provided outward (toward the other end 102 side) from the magnetic bearing 20 in the direction of the rotation axis X1 of the rotor 100, but the position where the displacement sensors 30 and 40 are provided is not limited thereto.

For example, the displacement sensor 30 may be provided inward (toward the other end 102 side) from the magnetic bearing 10 in the direction of the rotation axis X1 of the rotor 100, and the displacement sensor 40 may be provided inward (toward the one end 101 side) from the magnetic bearing 20 in the direction of the rotation axis X1 of the rotor 100. Even in this way, again, the displacements e11 and e12 at the one end 101 side and the displacements e21 and e22 at the other end 102 side of the rotor 100 can be measured by the displacement sensors 30 and 40.

REFERENCE SIGNS LIST

1: control device
10, 20: magnetic bearings
25: thrust bearing
30: displacement sensor
31: first displacement sensor
32: second displacement sensor
33: arithmetic unit
40: displacement sensor
41: first displacement sensor 42: second displacement sensor
43: arithmetic unit
50: mode classification unit
60: parallel mode controller
70: conical mode controller
80: mode synthesization unit
90 coefficient selection unit
100: rotor
101: one end
101a: magnet
102: the other end
102a: magnet
110: disk
E1, E2: displacements
F1, F2: inclinations
U1, U2: mode classification coefficients
J1, J2: output values
V: mode synthesization coefficient
Z1, Z2: control powers
R: rotational speed
M: excitation frequency
i: counter
N: integer

The invention claimed is:

1. A control device for a magnetic bearing, comprising:
a magnetic bearing including electromagnets at one and the other end sides of a shaft member and supporting the one and the other end sides of the shaft member contactlessly by a magnetic attraction force of the electromagnets; and
an inclination measuring device that measures a first inclination at the one end side of the shaft member and a second inclination on the other end side of the shaft member, wherein
the control device controls the magnetic attraction force of the electromagnets based on the first inclination and the second inclination measured by the inclination measuring device;
wherein the inclination measuring device includes:
a first displacement sensor provided at the one end side of the shaft member,
a second displacement sensor provided adjacent to the first displacement sensor in an axial direction of the shaft member,
a third displacement sensor provided at the other end side of the shaft member, and
a fourth displacement sensor provided adjacent to the third displacement sensor in the axial direction of the shaft member;
wherein the inclination measuring device includes an arithmetic unit, wherein the arithmetic unit:
calculates the first inclination at the one end side of the shaft member based on a first displacement of the shaft member measured by the first displacement sensor and a second displacement of the shaft member measured by the second displacement sensor, and
calculates the second inclination at the other end side of the shaft member based on a third displacement of the shaft member measured by the third displacement sensor and a fourth displacement of the shaft member measured by the fourth displacement sensor;
a mode classification device that classifies a vibration mode unique to the shaft member based on a first control parameter;
a plurality of controllers that generates control power to be supplied to the electromagnets according to the classified vibration mode;
a mode synthesization device that synthesizes the control power generated by the plurality of controllers based on a second control parameter; and
a control parameter setting unit that sets the first control parameter and the second control parameter based on the first inclination at the one end side of the shaft member and the second inclination at the other end side of the shaft member.

2. The control device for a magnetic bearing according to claim 1, wherein the control parameter setting unit changes the first control parameter and the second control parameter according to the classified vibration mode, when the first inclination at the one end side of the shaft member and the second inclination at the other end side of the shaft member are in the same direction or in the opposite directions.

3. The control device for a magnetic bearing according to claim 2, wherein the first displacement sensor and the second displacement sensor are provided outward in an axial direction of the magnetic bearing that contactlessly supports the one end side of the shaft member, and
the third displacement sensor and the fourth displacement sensor are provided outward in the axial direction of the magnetic bearing that contactlessly supports the other end of the shaft member.

4. The control device for a magnetic bearing according to claim 3, wherein
the unique vibration mode of the shaft member includes
a parallel mode in which the shaft member is vibrated in a parallel state, and
a conical mode in which the shaft member is vibrated in an inclined state, and
the mode classification device
classifies the unique vibration mode into either the parallel mode or the conical mode based on the first control parameter.

5. A control device for a magnetic bearing, comprising:
a magnetic bearing including electromagnets at one and the other end sides of a shaft member and supporting the one and the other end sides of the shaft member contactlessly by a magnetic attraction force of the electromagnets; and
an inclination measuring device that measures a first inclination at the one end side of the shaft member and a second inclination on the other end side of the shaft member, wherein
the control device controls the magnetic attraction force of the electromagnets based on the first inclination and the second inclination measured by the inclination measuring device;
wherein the inclination measuring device includes:
a first displacement sensor provided at the one end side of the shaft member,
a second displacement sensor provided adjacent to the first displacement sensor in an axial direction of the shaft member,
a third displacement sensor provided at the other end side of the shaft member, and
a fourth displacement sensor provided adjacent to the third displacement sensor in the axial direction of the shaft member;
wherein the inclination measuring device includes an arithmetic unit, wherein the arithmetic unit:
calculates the first inclination at the one end side of the shaft member based on a first displacement of the shaft member measured by the first displacement sensor and a second displacement of the shaft member measured by the second displacement sensor, and calculates the second inclination at the other end side of the shaft member based on a third displacement of the shaft member measured by the third displacement sensor and a fourth displacement of the shaft member measured by the fourth displacement sensor;

a mode classification device that classifies a vibration mode unique to the shaft member based on a first control parameter;

a plurality of controllers that generates control power to be supplied to the electromagnets according to the classified vibration mode;

a mode synthesization device that synthesizes the control power generated by the plurality of controllers based on a second control parameter; and a control parameter setting unit that sets the first control parameter and the second control parameter based on a rotational speed or an excitation frequency of the shaft member.

6. A control device for a magnetic bearing, comprising:

a magnetic bearing including electromagnets at one and the other end sides of a shaft member and supporting the one and the other end sides of the shaft member contactlessly by a magnetic attraction force of the electromagnets; and an inclination measuring device that measures a first inclination at the one end side of the shaft member and a second inclination on the other end side of the shaft member, wherein the control device controls the magnetic attraction force of the electromagnets based on the first inclination and the second inclination measured by the inclination measuring device;

wherein the inclination measuring device includes:
  a first displacement sensor provided at the one end side of the shaft member,
  a second displacement sensor provided adjacent to the first displacement sensor in an axial direction of the shaft member,
  a third displacement sensor provided at the other end side of the shaft member, and
  a fourth displacement sensor provided adjacent to the third displacement sensor in the axial direction of the shaft member;

wherein the inclination measuring device includes an arithmetic unit, wherein the arithmetic unit:
  calculates the first inclination at the one end side of the shaft member based on a first displacement of the shaft member measured by the first displacement sensor and a second displacement of the shaft member measured by the second displacement sensor, and
  calculates the second inclination at the other end side of the shaft member based on a third displacement of the shaft member measured by the third displacement sensor and a fourth displacement of the shaft member measured by the fourth displacement sensor;

wherein the inclination measuring device includes the first displacement sensor that measures the displacement of the one end side of the shaft member, and the third displacement sensor that measures the displacement of the other end side of the shaft member, the inclination measuring device further includes a slide mechanism that moves the shaft member between a first position and a second position in the axial direction, and the arithmetic unit calculates an inclination at the one end side of the shaft member based on a fifth displacement at the first position and a sixth displacement at the second position of the shaft member measured by the first displacement sensor, and calculates an inclination at the other end side of the shaft member based on a seventh displacement at the first position and an eighth displacement at the second position of the shaft member measured by the third displacement sensor.

7. The control device for a magnetic bearing of claim 6, wherein the shaft member has a transversely asymmetric position of center of gravity in the axial direction of the shaft member.

8. A control method of a magnetic bearing including electromagnets at one and the other end sides of a shaft member and supporting the one and the other end sides of the shaft member contactlessly by a magnetic attraction force of the electromagnets, the control method comprising:

an inclination measurement step of measuring a first inclination at the one end side and a second inclination at the other end side of the shaft member; and a control step of controlling the magnetic attraction force of the electromagnets based on the measured first and second inclinations a vibration mode measurement step of measuring a vibration mode unique to the shaft member;

a mode classification step of classifying the unique vibration mode of the shaft member based on a first control parameter;

a control power generation step of generating control power to be supplied to the electromagnets according to the classified vibration mode;

a mode synthesization step of synthesizing the control power generated in the control power generation step based on a second control parameter; and a control parameter setting step of setting the first control parameter and the second control parameter based on the first inclination at the one end side of the shaft member and the second inclination at the other end side of the shaft member.

9. The control method of a magnetic bearing according to claim 8, wherein the control parameter set step includes
  changing the first control parameter and the second control parameter according to the classified vibration mode of the shaft member, when the first inclination at the one end side of the shaft member and the second inclination at the other end side of the shaft member are in the same direction or in the opposite directions.

10. The control method of a magnetic bearing according to claim 9, wherein the unique vibration mode of the shaft member includes
  a parallel mode in which the shaft member is vibrated in a parallel state, and
  a conical mode in which the shaft member is vibrated in an inclined state,
  and the mode classification step
  classifies the unique vibration mode into either the parallel mode or the conical mode based on the first parameter.

11. The control method of a magnetic bearing according to claim 8, wherein the shaft member has a transversely asymmetric position of center of gravity in the axial direction of the shaft member.

* * * * *